(No Model.)

C. THOMAS.
ROAD CART.

No. 467,962. Patented Feb. 2, 1892.

Witnesses:
Eugene Humphrey
Ralph W. E. Hopper

Inventor:
Chauncey Thomas
for T. W. Porter, Atty

UNITED STATES PATENT OFFICE.

CHAUNCEY THOMAS, OF BOSTON, MASSACHUSETTS.

ROAD-CART.

SPECIFICATION forming part of Letters Patent No. 467,962, dated February 2, 1892.

Application filed October 17, 1891. Serial No. 409,031. (No model.)

*To all whom it may concern:*

Be it known that I, CHAUNCEY THOMAS, of Boston, in the county of Suffolk and State of Massachusetts, have invented a new and useful Improvement in Carriages, which will, in connection with the accompanying drawings, be hereinafter fully described, and specifically defined in the appended claims.

Figure 1:
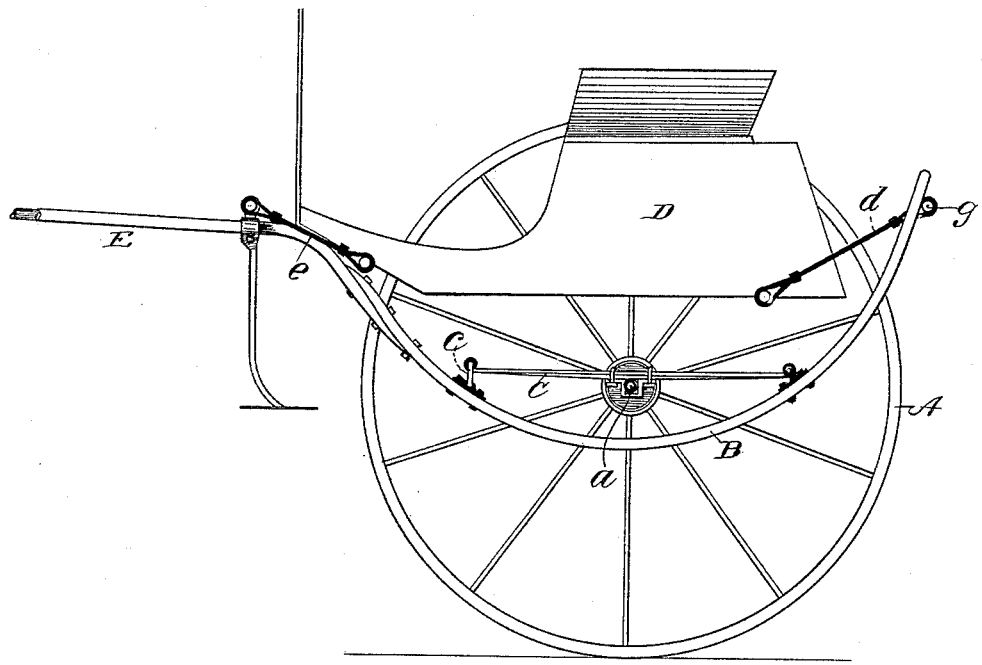
Figure 2:
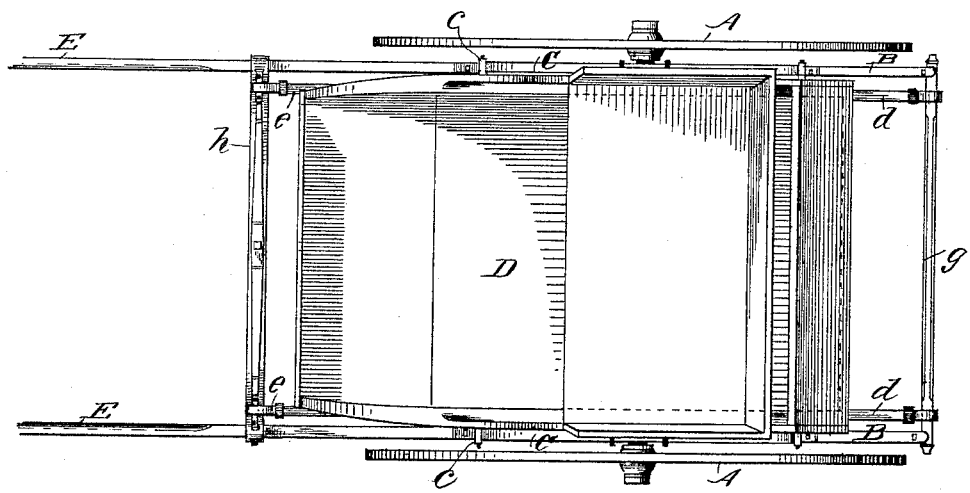

In said drawings, Figure 1 is a side elevation of a vehicle embodying my invention, the near wheel being removed; and Fig 2 is a top plan view of the entire vehicle.

The object of my invention is to provide a light, easy-riding, and easy-running two-wheeled vehicle; and this I accomplish by the use of upturned wooden springs, which are attached to the axle by means of a steel spring clamped to the axle at the center of the spring, which at one end is pivoted to the wood spring with, and at the other end without, a link, said wood springs extending forward and constituting the shafts, and to which the body is suspended by short thorough-braces attached to a cross-bar at the rear and to the whiffletree-bar at the front, all as will be hereinafter described.

Referring again to said drawings, A A represent the wheels, which are of proper size and strength. The axle is shown at $a$ and the wooden springs at B B, and these springs are attached to the axle through the steel springs C C, which at their center are secured to the axle and at one end, preferably the rear, are pivoted direct to a plate bolted to spring C, while at their front end they connect with a plate bolted to spring C by a short metallic link $c$. The body D is suspended by short thorough-braces $d$ to a cross-bar $g$ at the rear and to whiffletree cross-bar $h$ by the thorough-braces $e$, secured to the studs $f$, that are secured in the bar. The springs B are united with shafts E, to which the horse is harnessed; but, if preferred, they may both be made in one. By thus employing the steel springs C the springs B move downward when subjected to strain, for both the reasons that springs C move at their ends in that direction, and springs B, between the ends of C, also move in the same manner, besides which I have a low-hung body without cranking the axle. As the inward strain of the thorough-braces is exerted, the springs B yield inwardly and downwardly, for the reason that they are so suspended upon springs C as to yield in that manner without constraint therefrom.

I claim as my invention—

1. In a two-wheeled vehicle, the combination of the bow-like springs supported by the springs C, secured at their center to the axle and at their ends to springs B, and the body supported between springs B, substantially as specified.

2. In a two-wheeled vehicle, the combination of the bow-like springs supported by the springs C, secured to the axle at their center and to springs B at their ends, and the shafts arranged to form a forward extension of said bow-like springs, substantially as specified.

3. In a two-wheeled vehicle, the combination of the bow-like springs supported by springs C, the body, and the thorough-braces connected with the body and the upturned arms of the springs by means of cross-bars, substantially as specified.

CHAUNCEY THOMAS.

Witnesses:
T. W. PORTER,
EUGENE HUMPHREY.